M. CARY, OF RACINE, WISCONSIN.

*Letters Patent No. 84,796, dated December 8, 1868.*

IMPROVED MEDICINE.

The Schedule referred to in these Letters Patent and making part of the same.

*To all whom it may concern:*

Be it known that I, M. CARY, of Racine, in the county of Racine, and the State of Wisconsin, have invented a new Compound of Matter to be Used as a Medicine; and I do hereby declare that the following is a full, clear, and exact description thereof, which will enable others skilled in the art to compound and use it.

The following are the ingredients of the compound, given in the proportions used:

One pound of ground bark of the root of wahoo.
One-fourth pound of ground gulber-root.
One-fourth pound of ground root of iron-plant.
One-fourth pound ground bark of the root of white pine.
One-fourth pound ground bark of the root of wild cherry.
One ounce of pulverized root of sanguinaria.
Six pounds best loaf-sugar, pulverized.
One-fourth pound wheat flour.

These ingredients are put in a suitable vessel which will not corrode, and thoroughly incorporated, after which cold water is put on the compound to soften it, but no more should be used than is absorbed, and which is necessary to cause the ingredients to adhere together when pressed.

This operation will take from two to three hours, according to the dryness of the ingredients. As a general rule, however, the compound will be sufficiently softened by the time the sugar is dissolved.

The mixture, thus prepared, should now be put in a press, having about ten pounds hydraulic power to the square inch, and remain there for fifteen days, after which the cake can be removed, and cut in pieces, or lozenges, of suitable size for use.

The ingredients, thus compounded and prepared, will be found to retain their medicinal qualities for an indefinite period, and have a much better effect on the system than when prepared with alcohol.

The gulber-root is well known to the Indians of Florida, and other southern States, where it grows, and has long been considered by them as an invaluable remedy for throat and lung-difficulties.

The root of iron-plant grows in considerable quantities in the pine-regions of North and South Carolina, and it has been used extensively by the Indians for curing acute bronchitis and pneumonia.

The other ingredients are well known, and their medicinal qualities have been thoroughly tested, and therefore need no particular description.

I use this medicine for curing consumption, bronchitis, asthma, dyspepsia, liver-complaint, rheumatism, catarrh, and all diseases arising from the impurities of the blood; and it is very effectual in removing the appetite for chewing tobacco.

The lozenges should be dissolved in the mouth, and at the same time breathing as much of their medicinal qualities into the lungs as possible. This operation will immediately stimulate the system, after which the use of the lozenges can be discontinued for two or three hours.

In some cases of consumption, I prefer, from time to time, to have the patient inhale a small quantity of the fumes of the lozenges when burning, which can be done by means of a clean pipe, or wrapping them with paper and lighting one end, the compound being combustible when thoroughly dry.

Having thus described my invention,

What I claim, and desire to secure by Letters Patent of the United States, is—

The ingredients herein named, compounded and pressed substantially as and for the purpose specified.

M. CARY.

Witnesses:
G. L. CHAPIN,
A. HAYWARD.